UNITED STATES PATENT OFFICE.

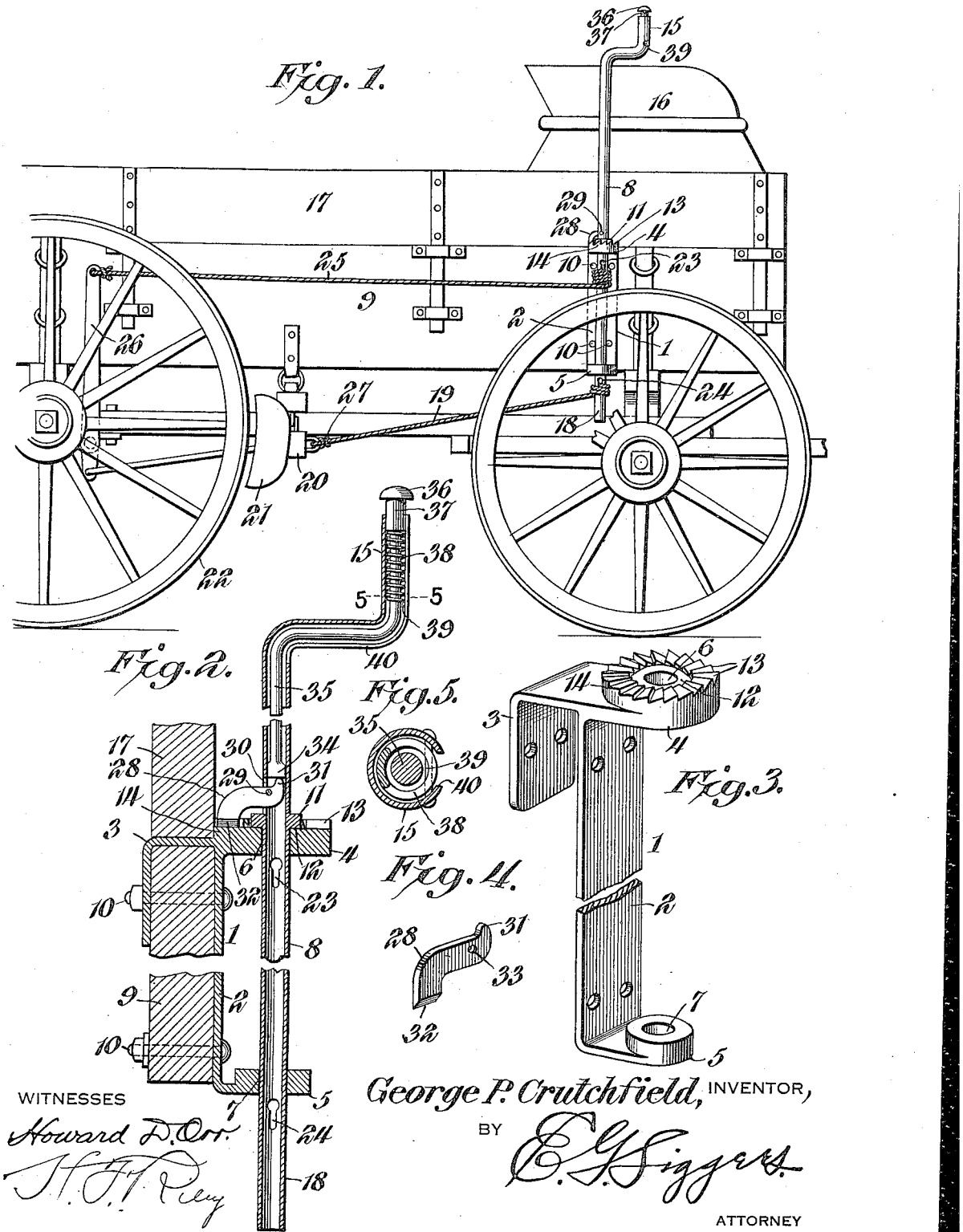

GEORGE PATTERSON CRUTCHFIELD, OF GREENSBORO, NORTH CAROLINA.

WINDLASS ATTACHMENT FOR VEHICLE-BRAKES.

1,075,902.  Specification of Letters Patent.  Patented Oct. 14, 1913.

Application filed February 28, 1913. Serial No. 751,383.

*To all whom it may concern:*

Be it known that I, GEORGE P. CRUTCHFIELD, a citizen of the United States, residing at Greensboro, in the county of Guilford and State of North Carolina, have invented a new and useful Windlass Attachment for Vehicle-Brakes, of which the following is a specification.

The invention relates to a windlass attachment for vehicle brakes.

The object of the present invention is to provide a simple, inexpensive and efficient windlass attachment adapted to be readily applied to various kinds of vehicles and to different styles or kinds of vehicle brakes, and capable of enabling a brake to be applied with great force, and equipped with means for positively carrying the brake shoes out of contact with the wheels to relieve the former of wear when the brake is released.

A further object of the invention is to provide a windlass attachment of this character, designed particularly for use on farm wagons, hay racks, stock racks, and the like, especially where it has been the practice to apply the brake by means of a rope or rod, and adapted to be arranged for operation at either side or end of a vehicle, and capable of being readily transferred from one vehicle body or rack to another.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a wagon provided with a windlass attachment, constructed in accordance with this invention. Fig. 2 is a vertical sectional view through the windlass attachment. Fig. 3 is a perspective view of the bearing bracket. Fig. 4 is a similar view of the locking dog or lever. Fig. 5 is an enlarged detail sectional view on the line 5—5 of Fig. 2.

Like numerals of reference designate corresponding parts in all the figures of the drawing.

In the accompanying drawing in which is illustrated the preferred embodiment of the invention, 1 designates a bearing bracket designed to be constructed of any suitable metal and comprising a vertical bar or portion 2, an upper inwardly extending approximately L-shaped arm 3, and upper and lower outwardly extending bearing arms 4 and 5, provided with vertically alined bearing openings 6 and 7 for the reception of a windlass shaft 8. The vertical bar or portion 2 of the bearing bracket is adapted to fit against the outer face of one side 9 of a wagon body and being preferably of a length to extend from the upper edge to the lower edge thereof, and secured to the wagon body by upper and lower bolts 10, preferably arranged in pairs, as shown, and piercing the vertical bar or portion 2 and the side 9 of the wagon body. The inner approximately L-shaped arm 3 extends over the upper edge and down the inner face of the side 9 of the wagon body, and it embraces the upper portion of the side 9, being secured to the same by the upper bolts 10, which pierce the downwardly extending portion of the arm 3. By this construction, the bearing bracket is securely mounted on the side of the wagon body, and it is also adapted to be readily removed therefrom by simply taking out the bolts 10, and it may be easily applied to any wagon body, hay rack, stock rack, wood rack, or the like.

The windlass shaft 8, which is vertically arranged, is preferably constructed of tubular metal, and it is provided at a point intermediate of its ends with a fixed collar 11, which is arranged upon the upper face of the upper bearing arm 4 against a smooth annular surface 12 within an annular series of ratchet teeth 13, constituting a fixed ratchet member and surrounding the upper bearing opening 6. The ratchet teeth are preferably formed on an enlargement or boss 14 of the upper bearing arm 4, but a fixed ratchet member of any other suitable construction may, of course, be employed. The upper portion of the windlass shaft extends above the bearing bracket a sufficient distance to arrange an upper crank handle 15 within easy reach of the seat 16 when a top box 17 is employed, and the said windlass shaft is provided at its lower end with an extension 18, projecting below the lower bearing arm 5 and adapted to be connected by a rope 19 or other flexible connection with a brake beam 20 for the purpose of moving the brake shoes 21 positively out of contact with the vehicle wheels 22 when the brake is released, whereby wear of the brake shoes is prevented. The windlass shaft is provided at its intermediate and lower portions with approximately key hole slots or openings 23 and 24; the slot or opening 23 is located immediately below the upper bearing arm 4, and it is adapted to receive one end of a flexible connection 25, consisting of a rope, chain or analogous device and extending rearwardly from the windlass shaft to an arm or lever 26 of the flexible brake.

The windlass shaft may be connected with any suitable brake mechanism and the winding of the flexible connection 25 on the windlass shaft will swing the arm or lever 26 forwardly and apply the flexible brake in the usual manner. By means of the windlass attachment, the brake may be applied with great power, and when the brake is released, the windlass shaft is rotated to wind the lower flexible connection 19 on the depending portion of the windlass shaft to positively draw the brake shoes away from the wheels. The rear end 27 of the flexible connection 19 is designed to be secured to the brake beam 20 near the central portion thereof, so as to exert a pull sufficiently near the center to draw both the brake shoes forwardly and prevent any swinging movement of the brake beam, causing one of the shoes to contact with the adjacent wheel. The front portions of the flexible connections 19 and 25 are wound around the windlass shaft in opposite directions, so that when the windlass shaft is rotated, one of the flexible connections will be wound up on it and the other unwound from it, so that neither flexible connection will interfere with the operation of the other.

A rope or chain may be readily passed through the enlarged portion of either of the key hole slots or openings 23 and 24, and after being arranged in the opening, such rope or chain is engaged with the lower contracted portion of the slot or opening and the winding of the rope or chain around the windlass shaft will retain the former in engagement with the latter. Also the flexible connections after being passed through the slots or openings 23 and 24 are adapted to prevent the windlass shaft from being jolted out of the bearing bracket. The detachable connection between the ropes 19 and 25 will enable the windlass shaft to be readily disconnected from the brake mechanism and removed from the bearing bracket. This may be found of advantage when a high load of any material is placed on a vehicle, or when it is desired to take the windlass shaft out of the way while loading or unloading a vehicle.

In practice the windlass shaft will be constructed of tubular metal, say an inch or an inch and a quarter in diameter or thereabout, and when it is removed from the bearing bracket, a long rod made from a sapling or even the branch of a tree may be used as a windlass shaft. In cutting or providing such a rod, it is preferable to leave a fork at the top so that the leg of the driver may be engaged with the upper portion of the rod for controlling the brake.

The windlass shaft is locked against retrograde rotation by means of a pivoted dog or lever 28, mounted on a pin 29 and extending through a spout or opening 30 in one side of the shaft 8 and having an inner upwardly extending terminal portion 31 and a downwardly extending outer terminal portion 32, beveled, as clearly illustrated in Fig. 4 of the drawing, and arranged to engage the ratchet teeth 13 of the fixed ratchet member of the bearing bracket. The pivot 29 pierces the opposite portions of the tubular windlass shaft and passes through a perforation 33 of the locking dog or lever. The upwardly extending terminal portion 31 is adapted to be engaged by an enlarged lower end 34 of a depressible rod 35, consisting of upper and lower vertical portions and a horizontal connecting portion and located within the upper extended portion of the windlass shaft and also within the crank handle thereof, as clearly illustrated in Fig. 2 of the drawing. The upper end of the depressible rod is provided with a head or button 36, having a tubular shank 37, which forms a shoulder at its lower end against which bears the upper end of a coiled spring 38, housed within the upper portion of the crank handle and interposed between the lower end of the tubular shank 37 and a transverse fastening device 39 of the crank handle. The crank handle is provided with a longitudinal slot 40, extending along one side of the vertical portion of the crank handle and under the horizontal portion thereof and adapted to facilitate the assembling of the parts in constructing the device. The fastening device 39, which forms a stop for the lower end of the spring, extends across the slot 40 and connects the side portions of the crank handle. The spring 38 normally supports the head of the depressible rod above the upper end of the crank handle of the windlass shaft, and when the rod 35 is depressed, its lower enlarged end 34 forces the inner upwardly extending terminal portion of the dog or lever 28 downwardly and lifts the outer portion of the lever out of engagement with the fixed ratchet member of the bearing bracket. The inner terminal portion 31 is preferably rounded, as shown, to effect an easy operation of the locking dog or lever.

The windlass attachment is adapted for use in connection with various kinds of vehicle brakes, and it may be arranged for operation at the end of a wagon body or rack for use in connection with the class of brakes, which require a central longitudinal pull to apply them.

What is claimed is:—

1. A windlass attachment for vehicle brakes including a bearing bracket comprising a vertical bar or portion adapted to fit against the outer face of the side of a wagon body or the like, an inner upper approximately L-shaped arm adapted to hook over the upper edge and fit against the inner face of the side of the wagon body or other portion of a vehicle without interfering with the use of a top box, upper and lower outwardly extending arms having vertically alined bearings, the upper bearing arm being also provided with a fixed ratchet member lying beyond the said L-shaped arms, a vertical windlass shaft removably arranged in the said bearings, a locking dog mounted on the windlass shaft above the bearing bracket and arranged to engage the ratchet member thereof, and means carried by the windlass shaft and connected with the dog for operating the same.

2. A windlass attachment for vehicle brakes including a bearing bracket provided with means for mounting it on a vehicle and having outwardly extending upper and lower arms provided with alined bearing openings, the upper arm being also provided with a fixed ratchet member, a vertical windlass shaft mounted in the bearing openings and provided with a lower depending extension and having an extended upper portion provided with a crank handle, means for connecting the lower extension of the windlass shaft at a point below the bearing bracket to a brake beam for moving the brake shoes away from the wheels, separate means for connecting the windlass shaft at a point between the upper and lower arms of the said bearing bracket with a brake for applying the same, a locking dog mounted on the windlass shaft and arranged to engage the fixed ratchet member, and operating means connected with the said dog and carried by the windlass shaft.

3. A windlass attachment for vehicle brakes comprising a bearing bracket having a fixed ratchet member, a vertical tubular windlass shaft mounted in the bearing bracket and provided with an upper crank handle consisting of vertical and horizontal portions, a locking lever pivotally mounted on and extending into the tubular windlass shaft and having its outer portion arranged to engage the said fixed ratchet member, and a yieldably mounted depressible rod extending longitudinally through the upper portion of the windlass shaft and through the crank handle thereof and having its lower end arranged to engage the locking lever, the upper end of the depressible rod being extended above the crank handle and adapted to be pressed downwardly to operate the locking lever.

4. A windlass attachment for vehicle brakes comprising a bearing bracket having a fixed ratchet member, a tubular windlass shaft mounted in the bearing bracket and provided at its upper end with a crank handle composed of vertical and horizontal portions and having a longitudinal opening extending along one side of the vertical portion and along the underside of the horizontal portion of the crank handle, a locking lever pivotally mounted on the windlass shaft and extending into the same, a depressible operating rod arranged within the upper portion of the windlass shaft and within the crank handle thereof and composed of upper and lower upright portions and a horizontal connecting portion and extending above the crank handle and adapted to be pressed downwardly to operate the locking lever, a coiled spring arranged within the vertical portion of the crank handle and yieldably supporting the depressible rod, and a fastening device spanning the longitudinal opening and connecting the side portions of the crank handle and forming a stop for the lower end of the coiled spring.

5. A windlass attachment for vehicle brakes including a bearing bracket provided with upper and lower horizontal arms having alined bearing openings, the upper arm being also provided around its opening with an annular series of ratchet teeth and having a smooth annular portion lying between the ratchet teeth and the opening of the upper arm, a vertical windlass shaft extending through the openings of the said arms and provided at a point intermediate of its ends with a fixed collar arranged upon the said smooth annular portion of the upper arm and supporting the windlass shaft, the latter being extended above the ratchet wheel and provided at its upper end with operating means, means carried by the windlass shaft for engaging the ratchet teeth, and means for connecting the windlass shaft with a brake.

In testimony, that I claim the foregoing as my own, I have hereto affixed my signature in the presence of two witnesses.

GEORGE PATTERSON CRUTCHFIELD.

Witnesses:
D. M. STAFFORD,
B. C. SHARPE, Jr.

---

Copies of this patent may be obtained for five cents each, by addressing the "Commissioner of Patents, Washington, D. C."